Figure 1:
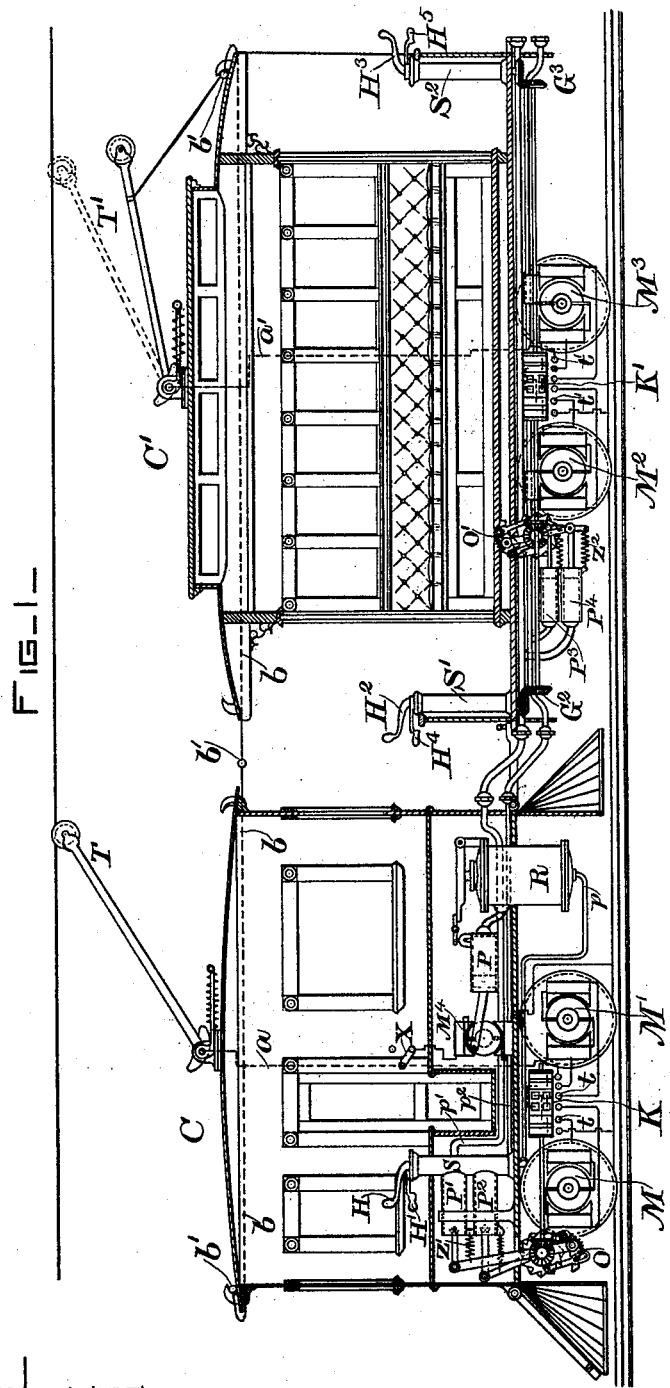

(No Model.) 2 Sheets—Sheet 1.

H. F. PARSHALL & J. W. DARLEY, Jr.
FLUID PRESSURE DEVICE FOR CONTROLLING ELECTRIC MOTORS.

No. 508,630. Patented Nov. 14, 1893.

WITNESSES
W. H. Bentley.
J. E. D. Langton

INVENTORS
Horace F. Parshall
John W. Darley, Jr.
by Bentley and Blodgett
Attys

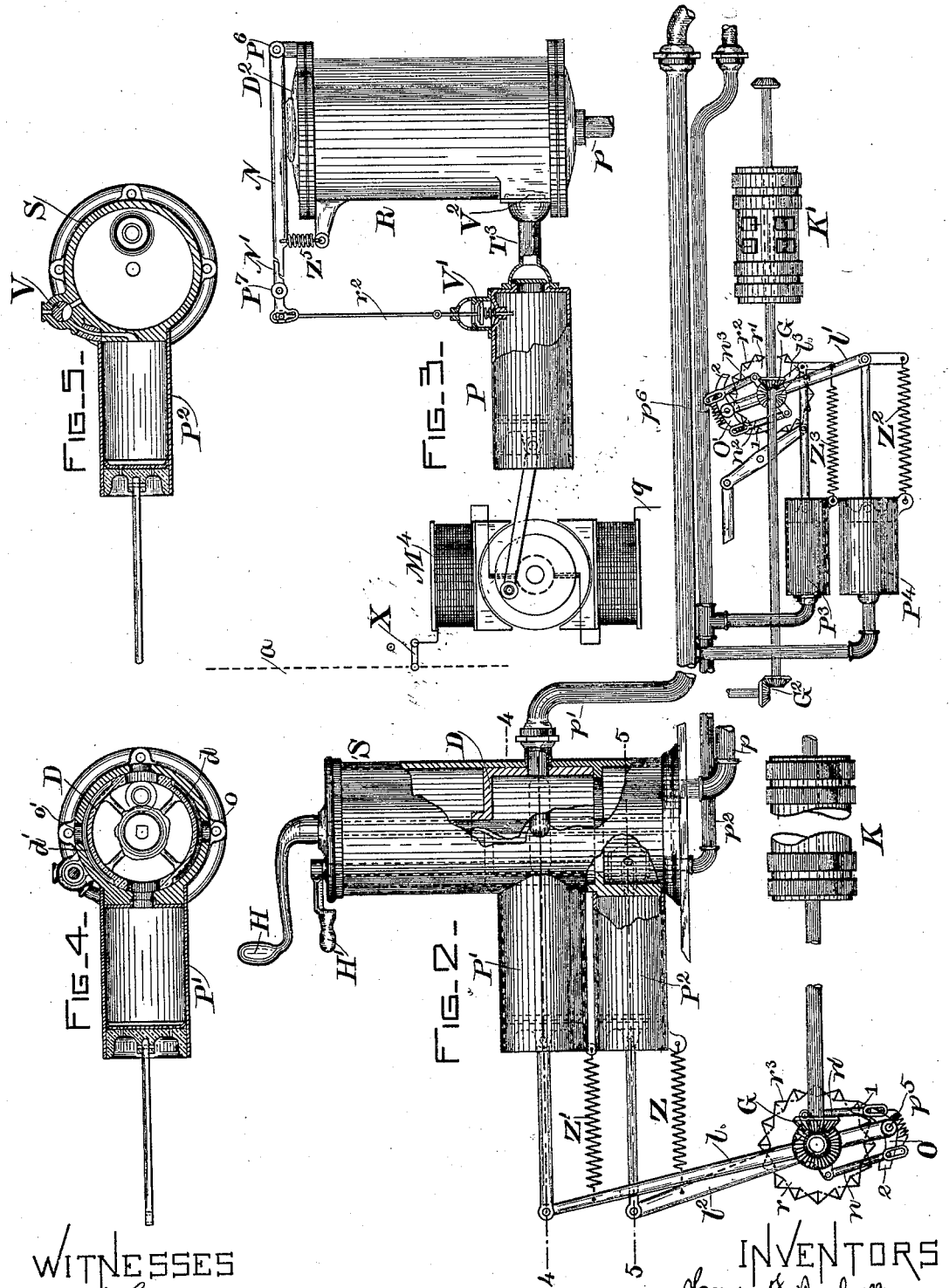

UNITED STATES PATENT OFFICE.

HORACE F. PARSHALL, OF LYNN, MASSACHUSETTS, AND JOHN W. DARLEY, JR., OF BALTIMORE, MARYLAND, ASSIGNORS TO THE GENERAL ELECTRIC COMPANY, OF BOSTON, MASSACHUSETTS.

FLUID-PRESSURE DEVICE FOR CONTROLLING ELECTRIC MOTORS.

SPECIFICATION forming part of Letters Patent No. 508,630, dated November 14, 1893.

Application filed May 6, 1893. Serial No. 473,323. (No model.)

*To all whom it may concern:*

Be it known that we, HORACE F. PARSHALL, a resident of Lynn, in the county of Essex and State of Massachusetts, and JOHN W. DARLEY, Jr., a resident of Baltimore, in the State of Maryland, citizens of the United States, have made certain new and useful Improvements in Controlling Electric Motors, of which the following is a specification.

Our invention relates to the control of electric motors, especially where several such motors are employed in the same work and are to be controlled or have their speeds varied simultaneously and is illustrated and described herein as applied to several motors upon a motor car or railway train which it is desired to regulate at the same time.

To obtain the required traction to propel a long or heavy train, or to drive a train of cars at extremely high speed, it is either necessary to employ a very heavy engine whose weight gives the requisite adhesion between its wheels and the track, or, if it is sought to reduce the weight of the train and still be able to run at a high speed, motive power must be applied to the axles of all or several of the vehicles comprising the train. In the latter case it is necessary that the different motors shall be as completely under the control of the driver or engineer as is the single engine or motor usually employed; and our invention particularly concerns such a system of control of a number of electric motors situated on different vehicles of the train as will fulfill this condition.

In the accompanying drawings, hereby annexed to and made part of this specification, Figure 1 represents an engineer's cab and a passenger coach fitted with our improved apparatus. Fig. 2, represents the controlling stand with its valve and piston and the connections to the controller-cylinders. Fig. 3, represents the air compressing apparatus. Fig. 4, is a section taken upon the line 4—4 of Fig. 2, and Fig. 5 is a similar section taken upon the line 5—5 of the same figure.

C represents the first car or driver's cab of a train of vehicles; this car carries, besides its own propelling motors, mechanism whereby all the motors of the train are simultaneously controlled.

C' may represent one of a number of cars making up the train, and likewise provided with motors for its propulsion. Each car of the train may be provided with motors, if desired, all controlled by the mechanism in the engineer's cab or again, there may be a number of cars not self-propelling interspersed between the motor-cars of the train. In the present description reference is made to two motors for each car, one applied to the axle at each end of the car, but it is to be understood that one motor or a plurality of motors may be used and controlled by the mechanism described with the same facility, the two motors being shown only to exemplify the capabilities of the method of control forming the subject of the present invention.

The current for the motors upon the train is shown as taken from an overhead conductor by means of trolleys. It might also be taken from conductors in an underground conduit, or from storage batteries carried upon the cars themselves, if desired. Each car having a motor or motors may have its own trolley or current collecting device, as indicated at T', and in this manner each motor car is enabled to run independently. When the train is very heavy or is mounting a steep grade, so that a large current is required, such auxiliary trolleys may be placed upon the trolley line in multiple with that of the engineer's cab. It is also preferred to connect the circuit of the various sets of motors, $a, a$, &c., by a common conductor $b, b$, &c., suitable couplings being attached at the points $b', b', b'$, &c., for connection with the train as made up. From the trolley T the current passes by the conductor $a$ to the motor $M^4$, upon the car C, which drives a small air compressor or air pump P, and the air after compression passes to a reservoir R. From this reservoir the air passes through a pipe $p$ to a controller stand S, and thence by pipes $p' p^2$ to pistons $P', P^2, P^3, P^4$, in cylinders upon or under the cars carrying the motors; the admission of air into these cylinders at the will of the engineer, acts to simultaneously control the action of the electric motors, as will be shown hereinafter.

Each motor car is shown as provided with two motors, M—M'; $M^2$—$M^3$, one for each axle, and the connection of these motors, their armature and field windings, in various combinations, is effected by controller-cylinders K, K', under each car. The changes of connection of the motors in circuit may or may not follow the series-parallel system of control, as may be desired but it is not necessary to minutely describe any system herein as it forms no essential part of the invention. The terminals from the armature and field-magnet windings may be led to terminal points or contact blocks shown at $t$, $t$, &c., $t'$, $t'$, &c., and these terminals may be connected during the rotation of the controller-cylinders K, K' in any predetermined and selected order to vary the speed and torque of the motors M—M', $M^2$—$M^3$, &c., for the various conditions of running. The controller-cylinders K, K', &c., as many in number as there are motor cars in the train, are simultaneously operated from the engineer's cab C, through the action of compressed air on the pistons P'—$P^2$, $P^3$—$P^4$, and counter-acting springs or their equivalent. One of the pistons of each car, as P', $P^3$, is adapted to move the controller-cylinders K, K' in either direction, while the other piston, $P^2$—$P^4$, determines the direction of rotation of the controller. The controller-cylinders K, K', carry contact-plates corresponding to the series or set of connections established for the motors M, &c., and it is therefore essential that the cylinders shall move in harmony or unison with one another by a "step-by-step" action. The succeeding figures and description will more clearly show how this is accomplished.

$M^4$ is a constantly running motor connected in circuit from T, and preferably shunt-wound. It runs an air-pump P, connected as shown, to the reservoir R for compressed air. The reservoir R is connected by a pipe $p$—$p$ to the air controller-box or stand S. The rotation of the handle H of this box operates an interior drum D, having ports (Figs. 2 and 4), so that upon its partial rotation air is admitted to the piston $p'$ and to the pipe $p'$ leading to the pistons $P^4$, &c., of the other cars, driving the piston heads outward and operating the pawls O, O', through the levers $l$, $l'$, and advancing the controllers, K, K' one step through the intermediate gearing G, the position of the drum D allowing admission of air in this manner, as shown in Fig. 4. A further partial rotation of the drum D cuts off the air from the pistons P—$P^4$ and allows its escape through the cut-away portion $d$ $d'$ of the drum and through the outlets or ports $o$ $o'$, powerful springs, Z' $Z^2$, attached to the levers $l$ $l'$, and opposing the action of the compressed air in the cylinders, assisting in the expulsion of the air. This operation is carried through at each half-rotation of the drum D, thus occurring twice in each revolution. The pawls O, O' then retreat until the half-rotation of the drum D is completed, when the action is repeated and so on. In this manner the reciprocation of the pawls O, O' is effected, being positive in action and repeated as rapidly as desired.

The operation of the handle H', Fig. 2, controls a three-way valve located at V, Fig. 5. In one position of the valve compressed air is admitted to the pistons $P^2$, $P^3$, &c., from the air-box S, and in the other the pistons $P^2$, $P^3$, &c., are put in communication with the external air. Levers $l^2$ and $l^3$ are connected with the piston-heads $P^2$, $P^3$ and are impelled in one direction by the compressed air, and in the other direction by the springs Z and $Z^3$, like the levers $l$, $l'$ described. They also connect with the pawls O and O' through links $n$, $n'$, $n^2$, $n^3$, as shown, and when thrown to one position by the compressed air the ends 1, 1 of the pawls O, O' are lowered into engagement with the ratchet wheels $r$, $r'$ and when retracted to the opposite position, under the influence of the springs Z, $Z^3$, the ends 1, 1 of the pawls are lifted out of engagement and the other ends 2, 2 depressed into engagement with the ratchet wheels $r^2$, $r^3$; in this position the reciprocation of the pawls O, O', actuated alternately in opposite directions by the compressed air in P' $P^4$ and the springs Z', $Z^2$, causes a reversed motion of the controllers K, K'. The pawls O, O' are independently movable about the pivots $p^5$, $p^6$. The position of the handle H' thus determines the direction of rotation of the controllers K, K' while the operation of the handle H governs the rate of such rotation in one direction or the other.

Fig. 3 shows more fully the construction of the air compressor and the reservoir. The motor $M^4$, of any character, is connected in a circuit by the switch X, the other terminal being shown at $q$. It drives an air compressor P, connected by a tube $T^3$, to the reservoir R. Control of the air pressure in R may be accomplished in various ways, one only of which need be shown. A lever N, pivoted at $P^6$ is connected through an intermediate lever N', pivoted at $P^7$ to rod $r^3$, attached to the valve V', adapted to close and open a passageway from the interior of the pump P to the external air. The upper end of the reservoir R, is provided with a diaphragm $D^2$, or a piston, which raises the lever N upon the augmentation of pressure in R against the action of a spring $Z^5$. Such an adjustment of the spring $Z^5$ is made that when a predetermined pressure has been reached in R, the valve V' is opened and the operation of the pump now merely causes an inward and outward flow of air through V'. When the pressure in the reservoir $R^2$, however, falls to a certain extent, following the demand for the operation of the electrical controllers, &c., the spring $Z^5$ reasserts itself, the valve V' is closed and the compressed air is again forced into R. An inwardly opening valve at $V^2$ admits air to R from the pipe T³, but prevents its return. This is only one of a number of arrangements which might be used for the same purpose. For example, the movements of the lever N in response to the varying conditions of pressure in the chamber R, might operate a switch controlling the action of the motor M⁴ to the circuit; and many other methods of control might be employed. The compressed air stored in the reservoir R may be used for other purposes than the operation of the controller cylinders K, K', &c., such, for instance, as the operation of an air-brake system in the ordinary manner. For the operation of the controller-cylinders K, K', &c., on the cars not provided with the air pressure or air storage when disconnected from a train, the usual mechanical control may be effected by controller stands S', S², geared at G² and G³ to the controller-cylinders, the handle for accomplishing such rotation being shown at H², H³, the handles H⁴, H⁵, operating a reversing switch in the usual manner.

It is manifest that our improved controlling apparatus may be as well applied to dynamos as to motors, should that be found advisable; and it is equally manifest that other fluids than air may be employed where they are conveniently accessible, but ordinarily air would be the only one practicable.

What we claim and wish to protect by Letters Patent of the United States, is—

1. In a system of controlling electric motors, a source of fluid-pressure, a cylinder carrying electric contacts and adapted by its rotation to vary the speed of an electric motor, and means, substantially as described, operated by the fluid-pressure and adapted to rotate the cylinder.

2. In a system of controlling electric motors, a source of fluid-pressure, a series of cylinders carrying electric contacts and each adapted by its rotation to vary the speed of an electric motor, and means, substantially as described, operated by the fluid-pressure and adapted to effect the simultaneous rotation of the cylinders.

3. In a system of controlling electric motors, a source of fluid-pressure, a cylinder carrying electric contacts controlling by its rotation an electric motor, and a pair of cylinders communicating with the source of pressure and having pistons actuated thereby, one of such pistons rotating the controller-cylinder and the other determining the direction of such rotation.

4. In a system of controlling electric motors, a source of fluid-pressure, a plurality of electric controller-cylinders, and a pair of cylinders communicating with the source of pressure and containing pistons actuated thereby, one of such pistons adapted to effect the simultaneous rotation of the controller-cylinders and the other piston adapted to determine the direction of such rotation.

5. In a system of controlling electric motors, a source of fluid-pressure, a cylinder carrying electric contacts controlling by its rotation an electric motor, and a pair of cylinders communicating with the source of pressure and having pistons actuated thereby, one of such pistons rotating the controller-cylinder and the other determining the direction of such rotation and means, substantially as described, controlling the admission of the fluid pressure to the cylinders.

6. In a system of controlling electric motors, a source of fluid-pressure, a plurality of electric controller-cylinders, and a pair of cylinders communicating with the source of pressure and containing pistons actuated thereby, one of such pistons adapted to effect the simultaneous rotation of the controller-cylinders and the other piston adapted to determine the direction of such rotation and means, substantially as described, controlling the admission of the fluid pressure to the cylinders.

7. In a system of controlling electric motors, a source of fluid-pressure, a cylinder, means for admitting pneumatic impulses thereto, a piston reciprocating therein connected to a lever operating pawls adapted to rotate a ratchet-wheel, and a controller-cylinder geared to such ratchet-wheel; whereby a step-by-step rotation is imparted to the controller-cylinder.

8. In a system of controlling electric motors, a source of fluid pressure, a cylinder, means for admitting pneumatic impulses thereto, a piston reciprocating therein connected to a lever operating pawls adapted to rotate a ratchet-wheel, a controller-cylinder geared to such a ratchet-wheel, in combination with means adapted to determine the direction of rotation of the ratchet-wheel; whereby a step-by-step rotation in either direction may be imparted to the controller-cylinder.

9. In a system of controlling electric motors, a source of fluid-pressure, a cylinder, means for admitting pneumatic impulses thereto, a piston therein moving in one direction under the pneumatic impulses and driven in the opposite direction by a spring and connected to a lever operating pawls engaging with a ratchet-wheel, and a controller-cylinder geared to such ratchet-wheel; whereby a step-by-step motion is imparted to the controller-cylinder.

10. In a system of controlling electric motors, a source of fluid-pressure, a cylinder, means for admitting pneumatic impulses thereto, a piston therein moving in one direction under pneumatic impulses and driven in the opposite direction by a spring and connected to a lever operating pawls engaging with a ratchet-wheel, and a controller-cylinder geared to said ratchet wheel, all in combination with means adapted to determine the direction of rotation of the ratchet-wheel; whereby a step-by-step motion in either direction may be imparted to the controller cylinder.

11. In a system of controlling electric motors, a source of fluid-pressure, a cylinder, means for admitting pneumatic impulses thereto, a piston therein driven in one direction by such impulses and in the other direction by a spring and connected to a lever, and means, substantially as described, whereby the position of the lever determines the direction of rotation of a controller-cylinder.

12. A cylinder, means for admitting pneumatic impulses thereto, a piston reciprocating therein connected to a lever, a pawl adapted to rotate a ratchet-wheel in one direction, a second pawl adapted to rotate such wheel in the opposite direction, and links attached to a cross-arm upon the lever and to the pawls; whereby the motion of the lever raises one pawl from the ratchet while bringing the other into engagement therewith, thus determining the direction of the rotation thereof.

13. A cylinder, means for admitting pneumatic impulses thereto, a piston reciprocating therein connected to a lever, a pawl adapted to rotate a ratchet-wheel in one direction, a second pawl adapted to rotate such wheel in the opposite direction, and links attached to a cross-arm upon the lever and by a slotted connection to the pawls; whereby the action of the lever raises one pawl from the ratchet while bringing the other into engagement therewith, the slot upon the link permitting free motion of the pawls, thus determining the direction of rotation of the ratchet-wheel.

14. A cylinder, means for admitting pneumatic impulses thereto, a piston reciprocating therein connected to a lever operating pawls one of which is adapted to rotate a ratchet-wheel in one direction, and the other adapted to rotate such wheel in the opposite direction, and a controller cylinder geared to such ratchet-wheel; in combination with a second cylinder, means for admitting pneumatic impulses thereto, a piston reciprocating therein connected to lever adapted to raise one of the pawls from the ratchet wheel and bring the other pawl into engagement therewith; whereby a step-by-step rotation in either direction may be imparted to the controller-cylinder.

15. A source of fluid-pressure, a valve box, a rotating valve therein provided with ports adapted to admit the fluid pressure to a cylinder and to discharge it therefrom, a piston in said cylinder driven in one direction by such fluid pressure and in the other direction by a spring and attached to a lever carrying pawls one of which is adapted to rotate the ratchet-wheel in one direction and the other in the opposite direction, and a controller-cylinder geared to such ratchet-wheel.

16. A source of fluid-pressure, an air-box communicating therewith, a drum valve within such air box adapted by its rotation to admit fluid-pressure to a cylinder or release the pressure therefrom, a piston reciprocating in such cylinder and connected to a lever carrying pawls engaging in opposite directions with a ratchet-wheel to which is geared a controller cylinder; whereby a step-by-step rotation of the controller cylinder in either direction may be effected.

17. A source of fluid-pressure, an air-box communicating therewith, a three-way valve adapted to admit the pressure in the box into a cylinder or exhaust it therefrom, a piston reciprocating within the cylinder and operating a lever provided with links engaging with two pawls, adapted the one to rotate a ratchet wheel in one direction and the other to rotate such wheel in the opposite direction; whereby the motion of the piston in one direction causes one of such pawls to engage with the ratchet-wheel while it lifts the other out of engagement, and its reversed motion causes the second pawl to engage while raising the first.

18. A source of fluid-pressure, an air-box communicating therewith, a drum-valve within such air-box adapted by its rotation to admit fluid pressure to a cylinder or release the pressure therefrom, a piston reciprocating in such cylinder and connected to a lever carrying pawls engaging in opposite directions with a ratchet-wheel, and a controller-cylinder geared to such ratchet-wheel all in combination with a three-way valve adapted to admit pressure from the air-box into a second cylinder or exhaust it therefrom, a piston reciprocating within such second cylinder and operating a lever provided with links engaging with the two pawls; whereby the piston in the first cylinder effects a step-by-step rotation of the controller-cylinder, and the piston in the second cylinder determines by its position the direction of such rotation.

In witness whereof we have hereunto set our hands this 11th day of April, 1893.

HORACE F. PARSHALL.
  JOHN W. DARLEY, Jr.

Witnesses for Parshall:
  JOHN W. GIBBONEY,
  BENJAMIN B. HULL.
Witnesses for Darley:
  M. HOLZMAN,
  A. WAGNER.